(12) United States Patent
Cheon et al.

(10) Patent No.: US 8,899,106 B2
(45) Date of Patent: Dec. 2, 2014

(54) METHOD FOR DETECTING STRUCTURAL STABILITY OF OBJECT AREA AND APPARATUS FOR THE SAME

(75) Inventors: Dae-Song Cheon, Daejeon (KR); Yong-Bok Jung, Daejeon (KR); Won-Kyong Song, Daejeon (KR)

(73) Assignee: Korea Institute of Geoscience and Mineral Resources, Yuseong-gu, Daejeon (KR)

( * ) Notice: Subject to any disclaimer, the term of this patent is extended or adjusted under 35 U.S.C. 154(b) by 331 days.

(21) Appl. No.: 13/371,520

(22) Filed: Feb. 13, 2012

(65) Prior Publication Data

US 2012/0210780 A1    Aug. 23, 2012

(30) Foreign Application Priority Data

Feb. 18, 2011   (KR) .......................... 10-2011-0014387

(51) Int. Cl.
*E21B 47/00*   (2012.01)
*G01M 5/00*   (2006.01)

(52) U.S. Cl.
CPC .......... *G01M 5/0083* (2013.01); *G01M 5/0041* (2013.01)
USPC ...................................... 73/152.54

(58) Field of Classification Search
CPC .............................. E21B 47/00; E21B 47/022
USPC ....................................... 73/152.54
See application file for complete search history.

(56) References Cited

U.S. PATENT DOCUMENTS

2002/0148222 A1* 10/2002 Zaslavsky et al. .............. 60/398

FOREIGN PATENT DOCUMENTS

JP    2010-230433 A    10/2010

* cited by examiner

*Primary Examiner* — Hezron E Williams
*Assistant Examiner* — Rodney T Frank
(74) *Attorney, Agent, or Firm* — Davis & Bujold, PLLC; Michael J. Bujold

(57) ABSTRACT

A method and apparatus are provided for detecting a structural stability of an object area. The method and apparatus include disposing a plurality of electrodes in the object area along a depth direction of the object area, surrounding the electrodes with a filling material; measuring a micro potential difference via the electrodes, generating a micro potential difference when the filling material is deformed by a force according to a change of the object area; and determining the structural stability of the object area based upon the measured micro potential difference.

11 Claims, 6 Drawing Sheets

US 8,899,106 B2

METHOD FOR DETECTING STRUCTURAL STABILITY OF OBJECT AREA AND APPARATUS FOR THE SAME

CROSS-REFERENCE TO RELATED APPLICATIONS

This application claims priority to Korean Application No. 10-2011-0014387, filed Feb. 18, 2011, which is herein incorporated by reference in its entirety.

BACKGROUND

1. Field

The following description relates to a method for detecting structural stability of an object area and an apparatus for achieving the same.

2. Description of Related Art

Generally, vibrograph, deformeter, a ground-water meter, etc., are used to predict collapse of vulnerable areas inside a construction such as a slope, a weak zone or a retaining wall.

A construction formed of bedrock may be fractured after little deformation. It is difficult to notice the deformation before fracture since there is no special sign of the fracture. The deformation may be noticed right before the fracture. However, since the sign of fracture cannot be predicted by measuring displacement, stress, etc., it is not proper to prepare for a collapse of the construction by measuring displacement, stress, etc. A change in groundwater may cause the construction to be weakened but reliable data, for determining a sign of fracture, cannot be obtained by measuring the change of groundwater.

Alternately, the sign of the fracture in the construction may be determined by measuring acoustic emission (AE) but, due to high cost, AE is not widely used at a construction site.

Furthermore, since the AE technology is installed on a surface of the construction and only used for detecting fracture(s) of the surface, it is not possible to detect sign(s) of fracture, according to deformation inside the construction, when mass destruction occurs. That is, since the AE technology detects only a superficial and ex post phenomenon, there are many cases that it is meaningless in preparing for the fracture.

SUMMARY

An embodiment of the present invention is directed to providing a method for detecting structural stability of an object area, when mass destruction occurs, that precisely detects phenomenon of signs in advance without using an expensive sensor, and an apparatus for achieving the same.

To achieve the embodiment of the present invention, a method is provided for detecting a structural stability of an object area, including: disposing a plurality of electrodes in the object area along a depth direction of the object area, the electrodes being surrounded by a filling material; measuring a micro potential difference via the electrodes, the micro potential difference being generated when the filling material is deformed by a force according to a change of the object area; and determining the structural stability of the object area, based on the measured micro potential difference.

The disposing of a plurality of electrodes in the object area, along a depth direction of the object area, may include, for example: forming a bore hole by boring the object area along a depth direction; disposing the electrodes along a depth direction inside the bore hole; and filling a space between the bore hole and the electrodes with the filling material.

The disposing of the electrodes along a depth direction inside the bore hole may include, for example: attaching the electrodes, to be spaced apart, to a non-conductive bracket; and disposing the bracket inside the bore hole.

The attaching of the electrodes to a non-conductive bracket may include, for example: forming the bracket by combining a plurality of rods having a different or the same length; and attaching one of the electrodes to each rod.

The filling of the space between the bore hole and the electrodes may include, for example: adding or filling a piezoelectric material or some other materials having a greater degree of saturation than the object area, as the filling material.

The piezoelectric material may include, for example, at least one of quartz, ceramic, lithium sulfate, lead metaniobate and barium titanite.

The measuring of a micro potential difference, via the electrodes, may be performed by a measuring device connected to each of the electrode by wires.

The determining of the structural stability of the object area, based on the measured micro potential difference, may include: determining the structural stability of the object area by comparing the measured micro potential difference with a test value in relation with a characteristic that the micro potential difference is generated by the force applied to the filling material.

The measured micro potential difference may be obtained to form a profile along a depth direction correspondingly to a location of the electrodes.

To achieve another embodiment of the present invention, an apparatus for detecting structural stability of an object area is provided, and the apparatus includes: a non-conductive bracket extended along a length direction such that the bracket is disposed inside a bore hole, which is dug or otherwise formed in the object area along a depth direction; a plurality of electrodes disposed along the bracket along the depth direction; a filling material surrounding the electrodes; and a measuring device electrically connected to each of the electrodes for determining, based on a micro potential difference measured by the electrodes, the state that the object area is deformed.

The bracket may include a plurality of rods that are detachably coupled together, end to end, to form an elongate member.

The filling material may include a piezoelectric material or some other material having a greater degree of saturation than the object area.

The piezoelectric material may include, for example, at least one of quartz, ceramic, lithium sulfate, lead metandobate and barium titanite.

The measuring device may include a transmitter for transmitting a determined result of the deformation state of the object area to a desired receiver.

DESCRIPTION OF SPECIFIC EMBODIMENTS

Figure 1:
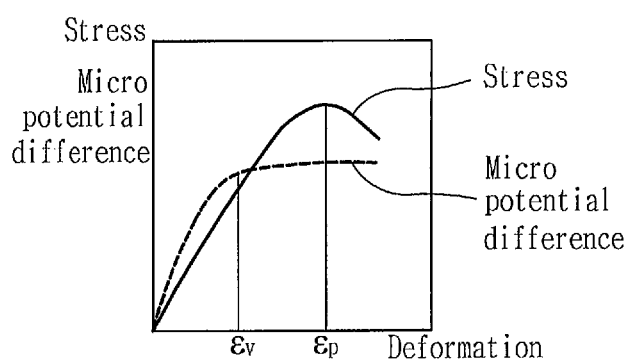
FIGS. 1 to 3 are conceptual views showing deformation as a result of stress applied to a sample and a change pattern of a micro potential difference.

Hereinafter, the method for detecting structural stability of an object area and an apparatus for the same will be described in detail with reference to the accompanying drawings. In all embodiments of this specification, the same or similar constituent elements have the same or similar reference numerals and the same description on the same or similar constituent elements in different exemplary embodiments will be identically applicable.

The method for detecting structural stability of an object area, according to an exemplary embodiment, intends to detect previously deformation of an object area such as bedrock, a slope, an earth structure(s), a retaining wall and a weak zone. This detecting method makes it possible to predict the possible collapse of the object area and also prepare for such possibility.

Figure 2:
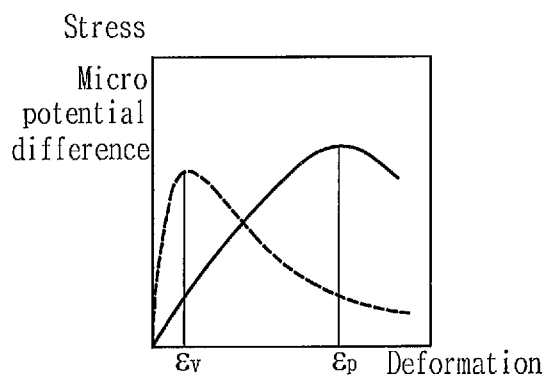
Figure 3:
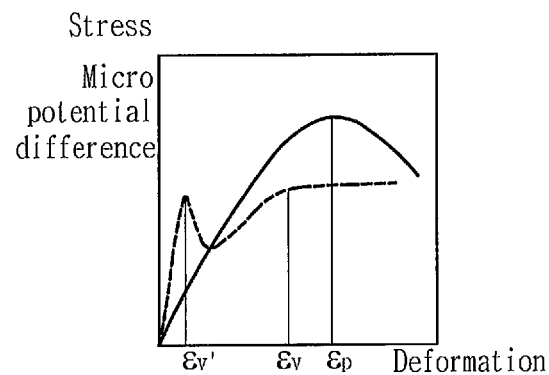

As a technical principle for detection, a potential difference, which is generated while the object area is deformed by a force applied to the object area, is measured in the exemplary embodiment. A basis of the measurement may be confirmed by a test in which stress is applied to a sample and this will be described further with reference to FIGS. 1 to 3. FIGS. 1 to 3 are conceptual views showing deformation by stress applied to a sample and a change pattern of a micro potential difference.

FIGS. 1 to 3 show that the micro potential difference is generated due to deformation by the force when samples, such as rock, concrete or soil, are exposed to a compressive force or a tensile force. The micro potential difference increases, according to the progress of the deformation, and maintains a predetermined level or remarkably decreases after reaching a peak value. However, it is common that an inflection point or a peak value of the micro potential difference is generated before deformation at a level where the sample can collapse.

To be specific, as shown in FIG. 1, according to compression of the sample, the micro potential difference maintains a regular or substantially constant value after reaching a predetermined value, which is typical. Statistically, this tendency appears in about 70% of total tests.

FIG. 2 shows the type where the micro potential difference decreases after clearly reaching the peak value.

FIG. 3 shows the type where the above-mentioned two types are combined. According to FIG. 3, the micro potential difference decreases after reaching the peak value, and again increases and maintains a constant or regular value.

$\epsilon_v$ represents a degree of deformation in the peak value or the inflection point of the micro potential difference, and $\epsilon_p$ represents a degree of deformation at a point of reaching a fracture stress. It is common that $\epsilon_v$ appears before $\epsilon_p$ in all types of FIGS. 1 to 3. As described above, this means that the peak value or the inflection point of the micro potential difference can be detected before fracture of the sample.

Figure 4:
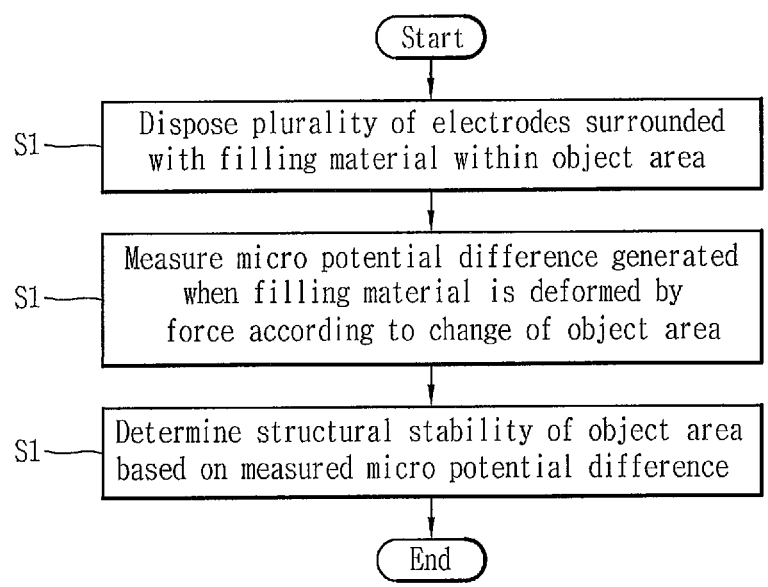
FIG. 4 is a flow diagram describing a method for detecting structural stability of an object area according to an exemplary embodiment.
Figure 5:
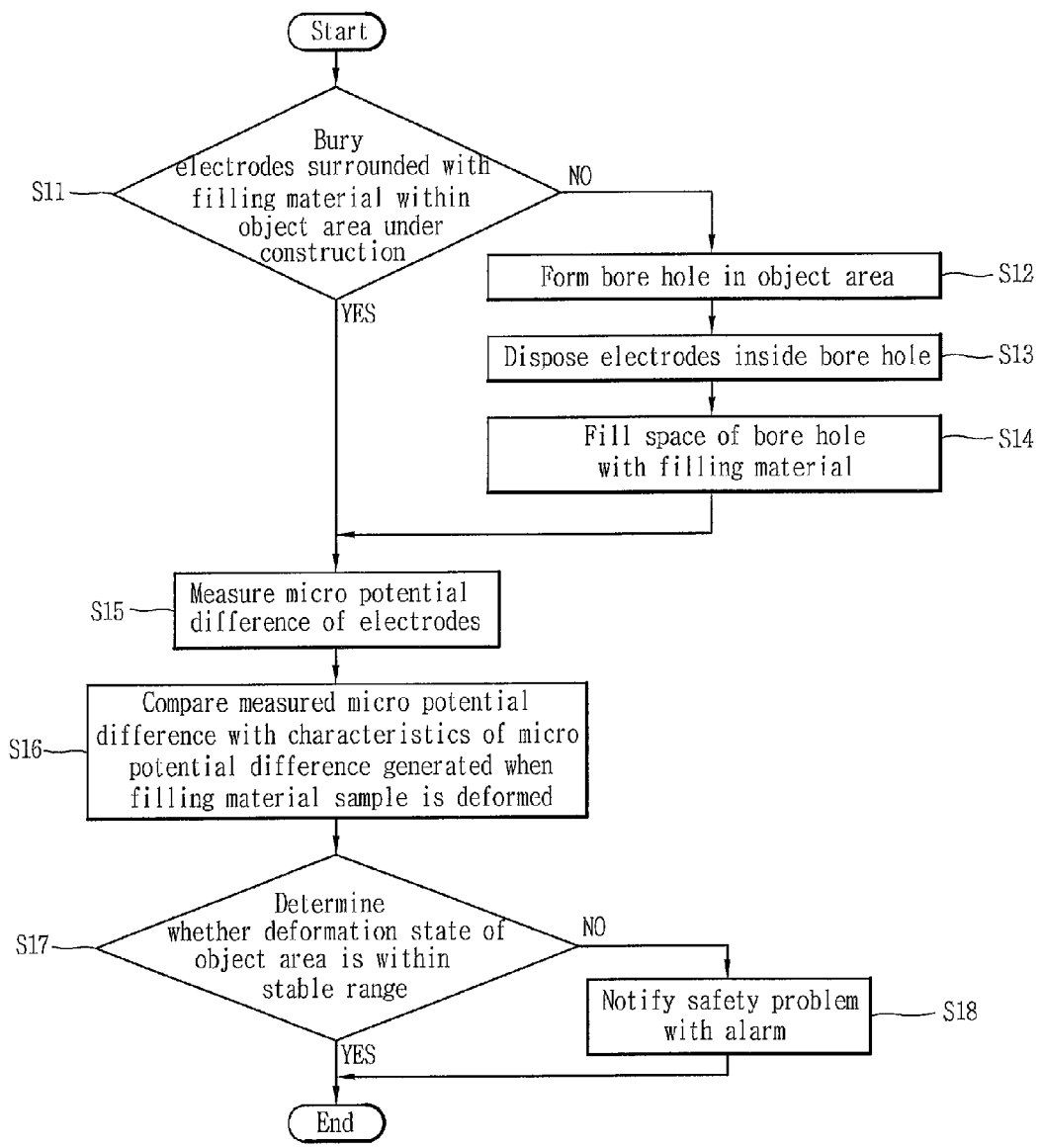
FIG. 5 is a flow diagram more specifically describing the method for detecting structural stability of an object area according to an exemplary embodiment.

Hereinafter, the method for detecting structural stability of an object area, based on the above principle, will now be described with reference to FIGS. 4 and 5. FIG. 4 is a flow diagram describing the method for detecting structural stability of an object area according to an exemplary embodiment. FIG. 5 is a flow diagram that more specifically describes the method for detecting structural stability of an object area according to an exemplary embodiment.

As shown in FIG. 4, the method for detecting structural stability of an object area, according to an exemplary embodiment, may include disposing a plurality of electrodes at step S1, measuring a micro potential difference at step S2, and determining structural stability of the object area at step S3.

When disposing the plurality of electrodes at step S1, the electrodes are disposed along a depth direction within the object area such that the electrodes are surrounded with a filling material.

When measuring the micro potential difference at step S2, the micro potential difference is generated when a filling material is deformed by a force according to a change of the object area.

When determining the structural stability of the object area at step S3, the structural stability of the object area is determined based on the measured micro potential difference.

The method for detecting structural stability of an object area will be described in further detail with reference to FIG. 5. The electrodes, surrounded with a filling material, may be buried within the object area under construction, at a step S11. As described above, the object area will be an area, such as a bedrock, a slope, an earth structure(s), a retaining wall or a weak zone, having a possibility of collapse. The electrodes may be disposed along a depth direction into the object area. The depth direction may include a vertical direction substantially normal to a surface of the object area or, alternatively, an inclined direction relative to a surface of the object area. Also, the electrodes are surrounded by the filling material. The filling material may be cement or mortar, a piezoelectric material, or a material having a greater degree of saturation than the object area. In case of using cement or mortar, an assembly of the filling material and the electrodes may be formed by disposing the electrodes along a depth direction, inside a cylindrical mold, and then pouring and curing the cement or the mortar inside the cylindrical mold. Thereafter, the assembly may be buried or installed, at a predetermined location(s), during building or other manufacture of the object area (e.g., during construction).

Alternatively, if the construction of the object area is completed, a method of subsequently forming or drilling a bore hole in the object area may be utilized, at a step S12. The bore hole may be formed via drilling at predetermined desired spaced apart location of the object area.

When a bore hole is formed, the electrodes are disposed, at a step S13, inside the bore hole along the depth direction. After disposing the electrodes, the remaining space inside the bore hole is filled with a filling material, at a step S14. A detailed installation layout, that includes maintaining the location of the electrodes at regular spaced intervals and connecting wires to each one of the electrodes, will be described in detailed with reference to FIG. 7.

As shown in FIG. 5, at step S15, the micro potential difference is measured, via the electrodes, at locations that are spaced apart along the depth direction of the object area. The micro potential difference is generated by deformation of the filling material when the filling material is deformed by a force which results in a deformation of the object area. By comparing potential of each electrode with a reference potential, a method of measuring a micro potential difference in each one of the electrodes is provided. According to another method, a relative micro potential difference of each electrode may be measured by comparing potentials in each electrode.

Deformation at a depth of the object area, i.e., at a location of the electrode, and a prediction of a possible collapse, according to the deformation, may be achieved by comparing the measured micro potential difference, according to the deformation of the filling material, with a set of general reference value(s).

Further, in this exemplary embodiment, the filling material, which disposed so as to surround the plurality of electrodes, is tested individually in a laboratory. A property of the generated micro potential difference, when the filling material is deformed, is set as the reference value and is compared with the micro potential difference, measured as described above.

Although constituent materials of the object area vary, objective measuring on the object area can be achieved by setting the test result on the filling material sample (even having the same shape as the filling material installed in the object area) as a reference value. To be specific, an amount of potential generation depends upon the types of rocks contained in the object area. A structure formed of rocks having a low amount of potential generation exists. However, the filling material serves as a booster for increasing the amount of potential generation even for rocks having a low amount of potential generation. The micro potential difference generated in the constituent materials of the object area is not directly measured, but the micro potential difference generated in the filling material is measured indirectly. However, effects according to mechanical characteristics or interactions between the object area and the filling material, which has to be considered by to using the indirect measurement method, technologically shows a negligible degree of error. As a result, according to the method that has a filling material as the object to be measured, according to an exemplary embodiment, mechanical accuracy is maintained and the reference value is not changed by the constitution or composition of the object area. Accordingly, the method according to the exemplary embodiment provides a benefit that the method can be used for analyzing diverse areas without any correction or modification.

By the above comparison, the deformation state of the object area is determined, at step S17. To be specific, if the measured micro potential difference is within a stable range, it is determined that the object area has no problem concerning safety.

However, if the measured micro potential difference is outside of the stable range, a safety problem of the object area can be indicated via an alarm, at step S18. Based on the alarm, a manager determines a deformation degree of the object area or in danger of collapse and decides whether to perform reinforcement work in the object area.

Figure 6:
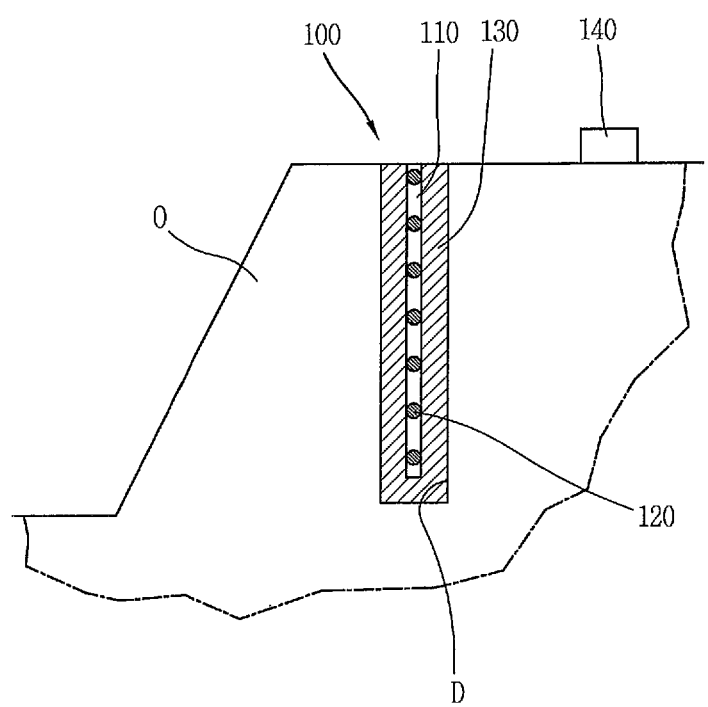
FIG. 6 is a conceptual view showing an exemplary installation of an object area stability detecting apparatus 100 using a potential difference according to an exemplary embodiment is installed.

An object area stability detecting apparatus 100, for realizing the above detecting method, will now be described with reference to FIG. 6. FIG. 6 is a conceptual view showing a state in which the object area stability detecting apparatus 100, using a potential difference according to an exemplary embodiment, is installed.

As shown in FIG. 6, the object area stability detecting apparatus 100 may include a non-conductive bracket 110, a plurality of electrodes 120, a filling material 130, and a measuring device 140.

The bracket 110 is generally made of a non-conductive material. The bracket 110 is inserted into a bore hole D, which is formed in an object area O, along a depth direction. The bracket 110 forms a frame to which the electrodes 120 are installed in a spaced apart relationship with respect to one another along the depth direction.

The electrodes 120 are disposed at different heights along a depth direction of the object area O such that the electrodes 120 are attached to the bracket 110. An inexpensive metal having good conductivity, e.g., a copper plate or the like, may be used as the electrodes 120.

The filling material 130 fills a space inside the bore hole D by surrounding the bracket 110 and the electrodes 120. The filling material 130 may have a cylindrical shape correspondingly to a shape of the bore hole D. A material such as cement or mortar, that is generally used at a construction site, may be used as the filling material 130. Alternatively, a piezoelectric material or a material having a greater degree of saturation than the object area O may be also used as the filling material 130. Since the piezoelectric material generates electricity when deformed, the piezoelectric material makes it easy to generate a micro potential difference. Examples of the piezoelectric material may include, for example, at least one of quartz, ceramic, lithium sulfate, lead metaniobate and barium titanite. It is to be appreciated that the material having a large degree of saturation also has the benefit of easily generating the micro potential difference.

The measuring device 140 is electrically connected to each of the electrodes 120 measure a micro potential difference for each one of the electrodes 120. The measuring device 140 determines a deformed state of the object area O based on the measured micro potential difference. The measuring device 140 may include a transmitter for transmitting determined results showing the deformed state of the object area O. A control center, with a receiver, receives the determined results from the transmitter and a manager can then use the determined result to evaluate the object area.

Figure 7:
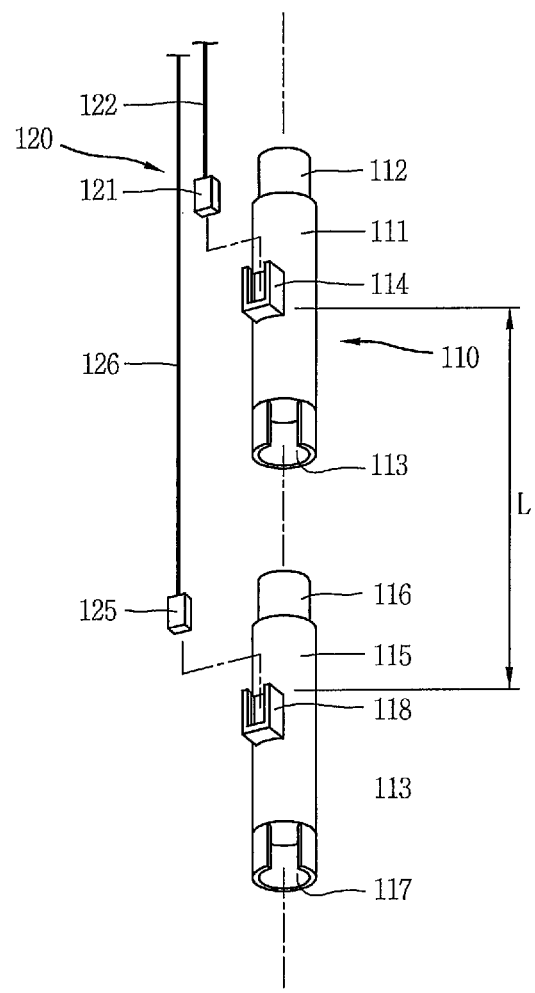
FIG. 7 is an exploded perspective view showing a method for assembling a bracket 110 and an electrode 120 of FIG. 6.

A detailed structure of the bracket 110 and the electrodes 120 will now be described with reference to FIG. 7. FIG. 7 is an exploded perspective view showing a method for assembling the bracket 110 and the electrode 120 of FIG. 6.

As shown in FIG. 7, the bracket 110 may be formed by a plurality of rods 111 and 115 which are detachable coupled, end to end, to one another. Considering that the bracket 110 may be inserted along a length of about 20 to 30 meters or more into the object area O, there may be difficulties in transporting and storing the bracket 110 when formed as an integral member.

In order to reliably couple the rods 111 and 115 at the construction site, a projection 112 may be formed at one end of the first rod 111 and a recess 113 may be formed at the other opposite end of the first rod 111. Also, a projection 116 may be formed at one end of the second rod 115 and the recess 117 may be formed at the other opposite end of the second rod 115.

Accordingly, the projection 116 of the second rod 115 may be inserted and received into the recess 113 of the first rod 111. The recess 113 has a partially opened ring shape. An inside diameter of the recess 113 may be less than an outside diameter of the projection 116. As a result, as the projection 116 of the second rod 115 is inserted into the recess 113, the projection 116 forcibly opens the recess 113 of the first rod 111. Accordingly, the projection 116 is thereby fixed retained within the recess 113 by force as the recess 113 tries to maintain its original state.

Holders 114 and 118 may be formed on a side wall of each of the rods 111 and 115. Each of electrodes 121 and 125 are respectively installed on one of the holders 114 and 118. Since intervals L between the holders 114 and 118 maintain a regular distance or spacing, the manager can accurately determine a depth of the electrodes 121 and 125. The interval L, between the holders 114 and 118, is generally determined based upon consideration of conditions such as a cost but generally has a length of about 1 meter.

Wires 122 and 126 respectively connected to the electrodes 121 and 125 may be attached to the rods 111 and 115 with a tape or some other conventional fastener. The wires 122 and 126 are waterproofed and extended to ground where they are coupled to the measuring device 140 (see FIG. 8). The measuring device 140 is connected to each one of the wires 122 and 126 and measures a micro potential difference of the associated electrodes 121 and 125 supplied by the wires 122 and 126.

The bracket 110 is formed by coupling of the rods 111 and 115. The bracket 110 is inserted into the above-mentioned bore hole D in a state that the electrodes 121 and 125—and the wires 122 and 126—are installed on the bracket 110 (see FIG. 6).

Figure 8:
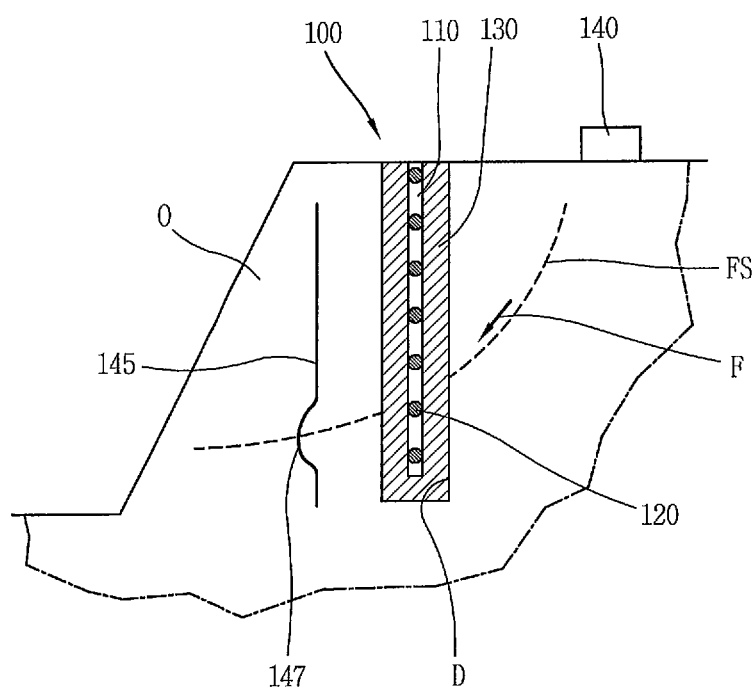
FIG. 8 is a conceptual view showing a profile of a micro potential difference measured by a measuring device 140 of FIG. 6.

An example of measuring the micro potential difference in the electrodes 120 will now be described with reference to FIG. 8. FIG. 8 is a conceptual view showing a profile of a micro potential difference measured by the measuring device 140 of FIG. 6.

As shown in FIG. 8, a vulnerable surface FS may exist inside the object area O. A force F is applied when the vulnerable surface FS is deformed. The force F is applied to the object area stability detecting apparatus 100, particularly to the filling material 130, in a direction along the vulnerable surface FS.

When the filling material 130 is deformed by the force F, a micro potential difference, according to the depth of the object area O measured in the electrodes 120, may form a profile 145. According to the profile 145, a micro potential difference 147 of an electrode corresponding to the portion, which mainly received the force and is deformed a lot, may have a higher value than the other portions.

By comparing the micro potential difference 147 with a micro potential difference according to deformation of the filling material 130, the manager determines a deformation degree of the filling material 130. In addition, strength of force applied to the object area O at a predetermined depth, and possible deformation or collapse of the object area O may be determined according to the deformation degree of the filling material 130.

According to the method for detecting the structural stability of the object area and the apparatus for achieving the same, when mass destruction occurs, phenomenon of signs is precisely detected in advance without using an expensive sensor.

Accordingly, it is possible to provide a means for preparing for mass destruction by previously determining an indication of destruction in consideration of economic feasibility in a construction site.

It will be apparent to those skilled in the art that the method for detecting structural stability of an object area and the apparatus for the same are not limited to the configuration and the operation method of the exemplary embodiments described above. The exemplary embodiments may be configured such that various changes and modifications may be made by selectively combining all or parts of the exemplary embodiments without departing from the spirit and scope of the invention as defined in the following claims.

What is claimed is:

1. A method of detecting a structural stability of an object area, the method comprising the steps of:
    forming a bore hole by boring into the object area along a depth direction;
    attaching a plurality of electrodes to a non-conductive bracket so that the plurality of electrodes are spaced apart from one another;
    disposing the bracket inside the bore hole;
    filling a space between the bore hole and the plurality of electrodes with the filling material, and the filling material comprising a piezoelectric material having a greater degree of saturation than the object area;
    measuring a micro potential difference via the plurality of electrodes, and the micro potential difference being generated when the filling material is deformed by a force according to a change of the object area; and
    determining the structural stability of the object area based upon the measured micro potential difference.

2. The structural stability detecting method of claim 1, wherein the step of attaching of the plurality of electrodes to the non-conductive bracket further comprises the steps of:
    forming the bracket by connecting a plurality of rods having the same length; and
    attaching one of the plurality of electrodes to each one of the plurality of rods.

3. The structural stability detecting method of claim 1, further comprising the step of using a piezoelectric material which is selected from the group consisting of quartz, ceramic, lithium sulfate, lead metaniobate, and barium titanite as the filling material.

4. The structural stability detecting method of claim 1, wherein the step of measuring the micro potential difference via the plurality of electrodes is performed by connecting, via wires, a measuring device to each one of the plurality of electrodes.

5. The structural stability detecting method of claim 1, wherein the step of determining of the structural stability of the object area, based upon the measured micro potential difference, further comprises the step of:
    determining the structural stability of the object area by comparing the measured micro potential difference with test values of the micro potential difference generated by a force applied to the filling material.

6. The structural stability detecting method of claim 5, further comprising the step of obtaining the measured micro potential difference to form a profile along a depth direction corresponding to a location of the plurality of electrodes.

7. An apparatus for detecting structural stability of an object area, the apparatus comprising:
    a non-conductive bracket extended along a length direction such that the bracket is disposed inside a bore hole, which is formed in the object area along a depth direction;
    a plurality of electrodes being disposed on the bracket along a length of the bracket;
    a filling material surrounding the plurality of electrodes, and the filling material including a piezoelectric material having a greater degree of saturation than the object area; and
    a measuring device electrically connected to each of the plurality of electrodes for determining whether the object area is deformed based upon a micro potential difference which is measured by the plurality of electrodes.

8. The structural stability detecting apparatus of claim 7, wherein the bracket includes a plurality of rods that are detachably coupled with one another.

9. The structural stability detecting apparatus of claim 7, wherein the filling material is a piezoelectric material which is selected from the group consisting of one of quartz, ceramic, lithium sulfate, lead metaniobate and barium titanite.

10. The structural stability detecting apparatus of claim 7, wherein the measuring device includes a transmitter for transmitting a determined result of a deformation state of the object area.

11. A method of detecting a structural stability of an object area, the method comprising the steps of:
  disposing a plurality of electrodes in the object area along a depth direction of the object area;
  surrounding the plurality of electrodes with a filling material;
  using a piezoelectric material, which is selected from the group consisting of quartz, ceramic, lithium sulfate, lead metaniobate, and barium titanite as the filling material;
  measuring a micro potential difference via the plurality of electrodes, and the micro potential difference being generated when the filling material is deformed by a force according to a change of the object area; and
  determining the structural stability of the object area based upon the measured micro potential difference.

* * * * *